(12) United States Patent
Koenig

(10) Patent No.: US 10,195,552 B2
(45) Date of Patent: Feb. 5, 2019

(54) WASTE PROCESSING SYSTEM

(71) Applicant: Paul Koenig, Mayer, MN (US)

(72) Inventor: Paul Koenig, Mayer, MN (US)

(*) Notice: Subject to any disclaimer, the term of this patent is extended or adjusted under 35 U.S.C. 154(b) by 0 days.

(21) Appl. No.: 14/913,191

(22) PCT Filed: Aug. 19, 2014

(86) PCT No.: PCT/US2014/051765
§ 371 (c)(1),
(2) Date: Feb. 19, 2016

(87) PCT Pub. No.: WO2015/026875
PCT Pub. Date: Feb. 26, 2015

(65) Prior Publication Data
US 2016/0199762 A1    Jul. 14, 2016

Related U.S. Application Data

(60) Provisional application No. 61/867,254, filed on Aug. 19, 2013.

(51) Int. Cl.
  *B01D 33/11* (2006.01)
  *C02F 1/02* (2006.01)
  *C10L 5/46* (2006.01)
  *B01D 33/073* (2006.01)
  *B01D 33/46* (2006.01)
  (Continued)

(52) U.S. Cl.
  CPC ............ *B01D 33/11* (2013.01); *B01D 33/073* (2013.01); *B01D 33/466* (2013.01); *C02F 1/02* (2013.01); *C05F 5/004* (2013.01); *C05F 7/00* (2013.01); *C10L 5/363* (2013.01); *C10L 5/44* (2013.01); *C10L 5/46* (2013.01); *C02F 2103/005* (2013.01); *Y02A 40/209* (2018.01);
  (Continued)

(58) Field of Classification Search
  CPC .... B01D 33/11; B01D 33/073; B01D 33/466; C10L 5/46; C10L 5/363; C10L 5/44; C02F 1/02; C02F 2103/005; C05F 7/00; C05F 5/004; Y02E 50/10; Y02E 50/30
  See application file for complete search history.

(56) References Cited

U.S. PATENT DOCUMENTS 4,001,115 A   1/1977   Arvanitakis
4,245,396 A   1/1981   Maffet
(Continued)

FOREIGN PATENT DOCUMENTS

CN   101817698 A   9/2010
CN   101998874 A   3/2011
(Continued)

OTHER PUBLICATIONS

Lenntech. "Precoat Filter" pp. 1-2 (2011) <https://www.lenntech.com/systems/sediment/precoat/precoatfilter-eng.htm>.*
(Continued)

*Primary Examiner* — Jennifer A Smith
(74) *Attorney, Agent, or Firm* — Billion & Armitage; Benjamin C. Armitage

(57) ABSTRACT

A device and method that removes moisture from human, animal, vegetable, and plant materials, yielding clear discharge water that can be returned to a sewage treatment plant. Some wastes can also yield fertilizer and an energy positive fuel source.

11 Claims, 4 Drawing Sheets

(51) Int. Cl.
  *C05F 5/00*      (2006.01)
  *C05F 7/00*      (2006.01)
  *C10L 5/36*      (2006.01)
  *C10L 5/44*      (2006.01)
  *C02F 103/00*    (2006.01)

(52) U.S. Cl.
  CPC ............ *Y02A 40/213* (2018.01); *Y02E 50/10* (2013.01); *Y02E 50/30* (2013.01)

(56) References Cited

U.S. PATENT DOCUMENTS

| | | | |
|---|---|---|---|
| 4,443,421 A * | 4/1984 | Hollifield | B01D 37/00 210/785 |
| 4,510,055 A | 4/1985 | White | |
| 4,511,468 A | 4/1985 | White | |
| 4,834,777 A | 5/1989 | Endebrock | |
| 4,979,315 A | 12/1990 | Pierson | |
| 5,051,191 A | 9/1991 | Rasmussen et al. | |
| 6,332,977 B1 | 12/2001 | Janecek | |
| 6,770,206 B2 | 8/2004 | Gasvoda | |
| 8,092,680 B2 | 1/2012 | Johnson | |
| 2006/0010712 A1 | 1/2006 | Carin et al. | |
| 2006/0096163 A1 | 5/2006 | Dickinson et al. | |
| 2011/0091953 A1* | 4/2011 | Bolin | C02F 9/00 435/167 |

FOREIGN PATENT DOCUMENTS

| | | |
|---|---|---|
| CN | 102322729 A | 1/2012 |
| EP | 0428014 A2 | 5/1991 |
| EP | 1894893 A1 | 3/2008 |
| JP | S50-49192 U | 5/1975 |
| JP | S60-82151 A | 5/1985 |
| JP | 61038611 A2 | 2/1986 |
| JP | 01218699 A2 | 8/1989 |
| JP | 01228516 A2 | 9/1989 |
| JP | 06134496 A2 | 5/1994 |
| JP | 07-284749 A | 10/1995 |
| JP | H09173721 A | 7/1997 |
| JP | 2002316198 A2 | 10/2002 |
| JP | 2003126899 A2 | 5/2003 |
| JP | 2004337972 A | 12/2004 |
| JP | 2006238728 A2 | 9/2006 |
| JP | 2008212800 A2 | 9/2008 |
| JP | 2000264764 A | 9/2009 |
| JP | 2010234233 A2 | 10/2010 |
| RU | 2058943 C1 | 4/1996 |
| RU | 2104968 C1 | 2/1998 |
| RU | 3226818 C1 | 8/1998 |
| RU | 2361823 C1 | 7/2009 |
| WO | 2009125048 A1 | 10/2009 |
| WO | 2010096899 A1 | 9/2010 |
| WO | 2010127442 A1 | 11/2010 |
| WO | 2012138048 A2 | 10/2012 |

OTHER PUBLICATIONS

International Search Report for International Application No. PCT/US2014/051765 dated Nov. 19, 2014.

Zhang, et al., "Precoat filtration performance of cellulose filter aid", Chemical Industry and Engineering Progress vol. 31, No. 3, Mar. 31, 2012, pp. 518-522. (English Abstract Only).

* cited by examiner

TYPICAL MUNICIPAL WWTP

WASTE PROCESSING SYSTEM

BACKGROUND OF THE INVENTION

Municipal sewage waste imposes significant environmental and handling costs, including damage to water and air quality. This problem has intensified with population growth and suburbanization. Significant time and energy inputs may be needed to process water and solids to (a) return clean water to surface waters and (b) render solid or liquid materials suitable for agricultural use.

In a standard process, wastewater enters the treatment plant and is treated via a series of large pools. In primary sewage pools, oil and grease are removed, and water in the waste begins to evaporate. In secondary pools, the water is further agitated and aerated. This promotes activity in the pool to release more water via evaporation and cause the waste to react to the air. In final pools, aeration continues, and treatment is concluded. The end wastewater product is malodorous but is only 1.5% solids on average.

In some locales, cities will arrange for the wastewater product to be hauled away, with it then being spread on fields as fertilizer. Environmental protection authorities often disfavor this handling because of risk to surface waters and groundwater as well as air quality. In addition, the waste may contain viruses and bacteria or other infectious microorganisms. Open field spreading of municipal waste can also result in municipal liability in the event of any environmental damage.

In some areas of the world, the processing of fresh fruit bunches of oil palm results in the generation of different types of residue. Among the waste generated, palm oil mill effluent (POME) is considered the most harmful waste for the environment if discharged untreated. POME is the wastewater discharged from the sterilization process, crude oil clarification process, and cracked mixture separation process. It results in clogging and water logging of the soil and kills any vegetation on contact. Currently, the most suitable, and frequently used, treatment method is a ponding system. However, ponding systems occupy a vast amount of landmass, have a relatively long hydraulic retention time, a bad odor, and difficult in maintaining the liquor distribution and biogas collection.

Access to an efficient source of biomass fuel is also a critical issue. Current biomass competition includes coal, wood pellets, natural gas and nuclear processes for production of energy. However, various markets, including Europe, have imposed fuel taxes based on carbon content (such as in coal and natural gas) or have mandated the use of clean energy sources such as biomass. Wood fiber resources are not sufficient to meet this demand. Processed human or animal waste products could provide a renewable and plentiful source of biomass fuel. However, current processing of such waste processing into fuel pellets involves substantial time, energy, transport fuel and labor inputs and charges. Use of these fuel pellets results in a net energy loss. With transport, the environmental issues are compounded because of the addition of truck fuel air pollution associated with moving heavy, high-moisture waste on the road.

Systems and methods are needed that (a) minimize human waste exposure to air and chance of waste release into surface water or groundwater and (b) reduce energy processing for both clean water and fertilizer and/or fuel pellets. Generally, a system is needed to efficiently and rapidly remove liquid from human waste and speed processing into clean water, fertilizer and/or fuel.

SUMMARY OF THE INVENTION

The system and methods as disclosed herein remove significant moisture content from human, animal, vegetable, and plant materials, yielding clear discharge water that can be returned to a sewage treatment plant. Some wastes can also yield fertilizer and an energy positive fuel source.

DETAILED DESCRIPTION

Figure 1:
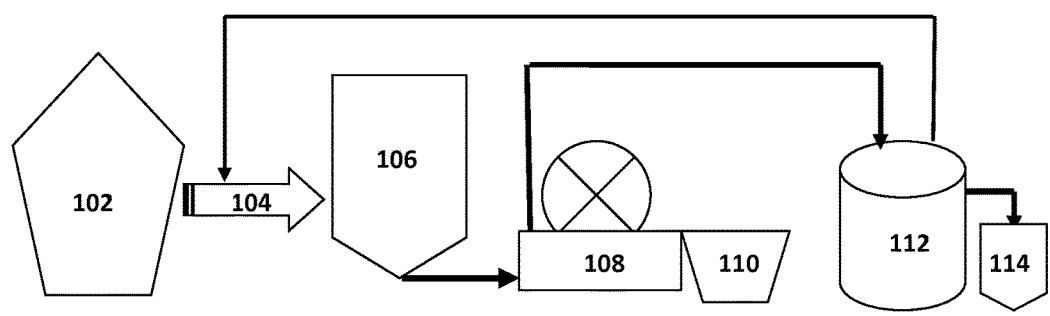
FIG. 1 is an example waste treatment train with a vacuum filter.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover application or embodiments without departing from the spirit or scope of the claims attached hereto. Also, it is to be understood that the phraseology and terminology used herein are for the purpose of description and should not be regarded as limiting.

In general terms, the systems and methods described herein illustrate a waste processing system that uses a burnable filter aid to produce clean water, fertilizer concentrate and combustible energy pellets. In some embodiments, the waste processing system is portable.

The term "waste" refers to any type of human, animal, or plant waste that may be used in the system to produce clean water, fertilizer or fuel pellets. Examples of human materials include, but are not limited to, wastewater with human waste, food scraps, oils, soaps, and chemicals in it. Animal material may include, but is not limited to, slaughterhouse byproducts known as clarifier sludge and animal manure. Clarifier sludge contains non-bone parts of the animal such as blood, manure, and other fatty parts. Plant material may include, but is not limited to, plant parts that come from vegetable processing and packing plants such as rejected vegetable pieces that are split, damaged, or spoiled as well as byproducts that, when processed, cast off a paste waste product. This type of plant waste can include sugar beets, rice hulls, wood shavings, or bedding that may normally be mixed with animal waste. Plant waste material may also include palm oil mill effluent (POME).

Figure 2:
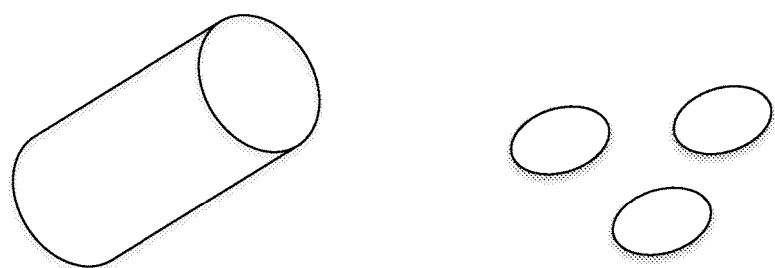
FIG. 2 illustrates example fuel pellet shapes.
Figure 3:
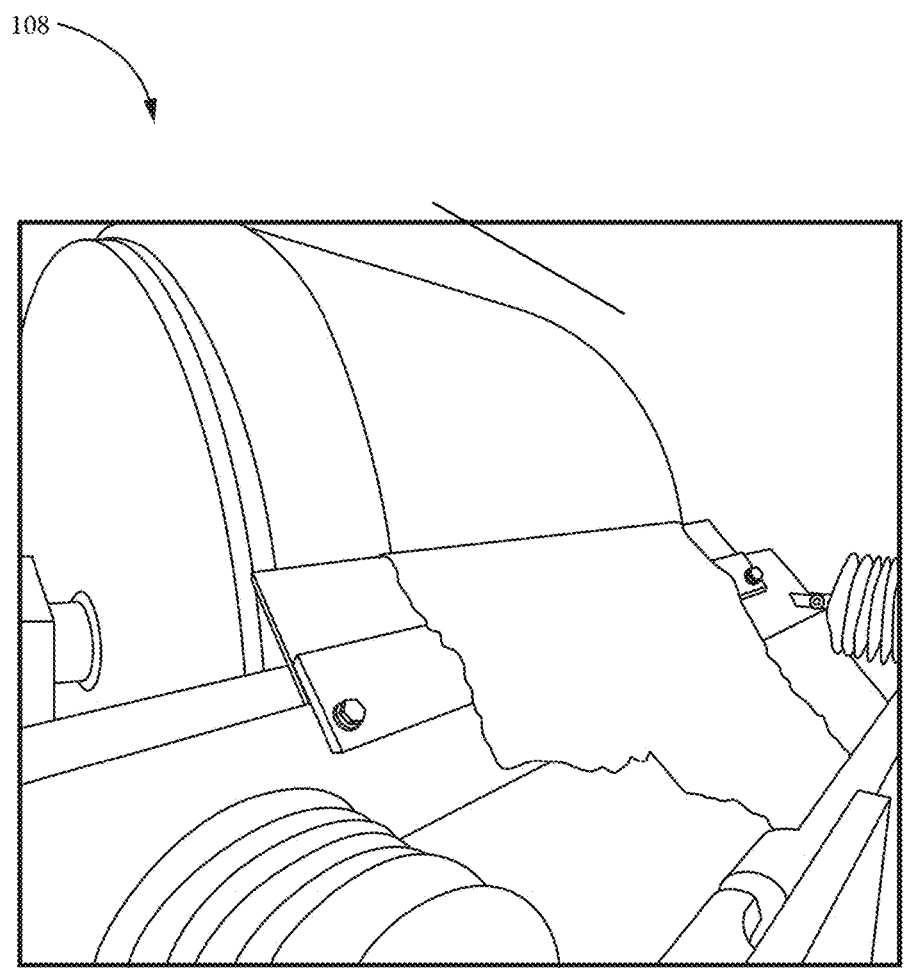
FIG. 3 illustrates an example drum filter.

The term "burnable filter aid" refers to a filter aid that is combustible. One example is a cellulosic filter aid. The filter aid may be included in an energy pellet that is produced using the processes described below. The energy pellet, including the filter aid, may be burned and used as a substitute for other energy sources such as, but not limited to, coal, wood pellets, natural gas, or nuclear processes. An example fuel pellet shape is illustrated in FIG. 2.

The term "slurry" refers to waste that has been liquefied, including with additional water, in the processes described herein. Slurry is sometimes referred to as municipal sludge, packing plant clarifier sludge, or vegetable processing plant liquefied waste.

The term "microwaving technology" refers to the use of a microwave to further dry a raw pellet by transforming the remaining liquid hydrogen dioxide molecules in the pellet into a gaseous state, and then clearing the molecules from the area around the pellet by using a fan. Microwaving may kill pathogens and reduce the possibility of public health risks. In one embodiment, the microwave may be a 1000-watt minimum microwave unit.

Figure 4:
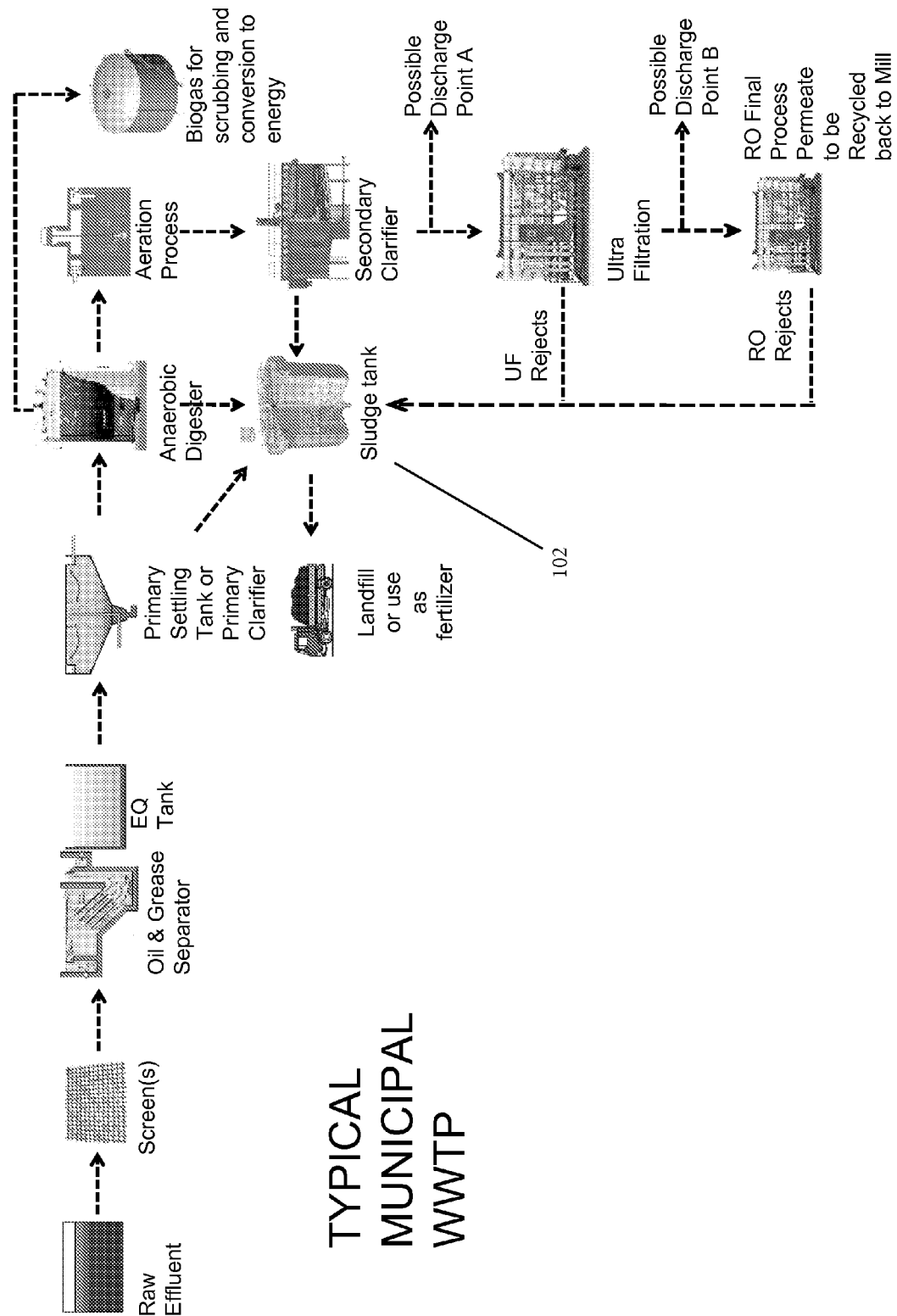
FIG. 4 illustrates an example of the current municipal wastewater treatment plant process.

FIG. 4 illustrates a typical municipal wastewater treatment process, which results in biogas, discharge from filtration, and sludge tank products. Biogas and filtration products are reusable, but sludge tank products are typically disposed of at a landfill or used as fertilizer. More specifically, raw effluent proceeds through a screen, an oil and grease separator, and an equalization tank before making it to a primary settling tank or primary clarifier. From the primary clarifier, the products can either go to an anaerobic digester or sludge tank. Products from the sludge tank are typically then transported to a landfill or used as fertilizer. Products from the anaerobic digester can go through an aeration process, can go to the sludge tank, or are biogas. From the aeration process, products then go through the secondary clarifier. At this point, the product goes to the sludge tank, is discharged, or goes through ultra filtration. After ultra filtration, the ultra filtration rejects go to the sludge tank. Other products can either be discharged or can go through a reverse osmosis process. Reverse osmosis rejects go to the sludge tank. Other product can be recycled back to a mill.

Figure 5:
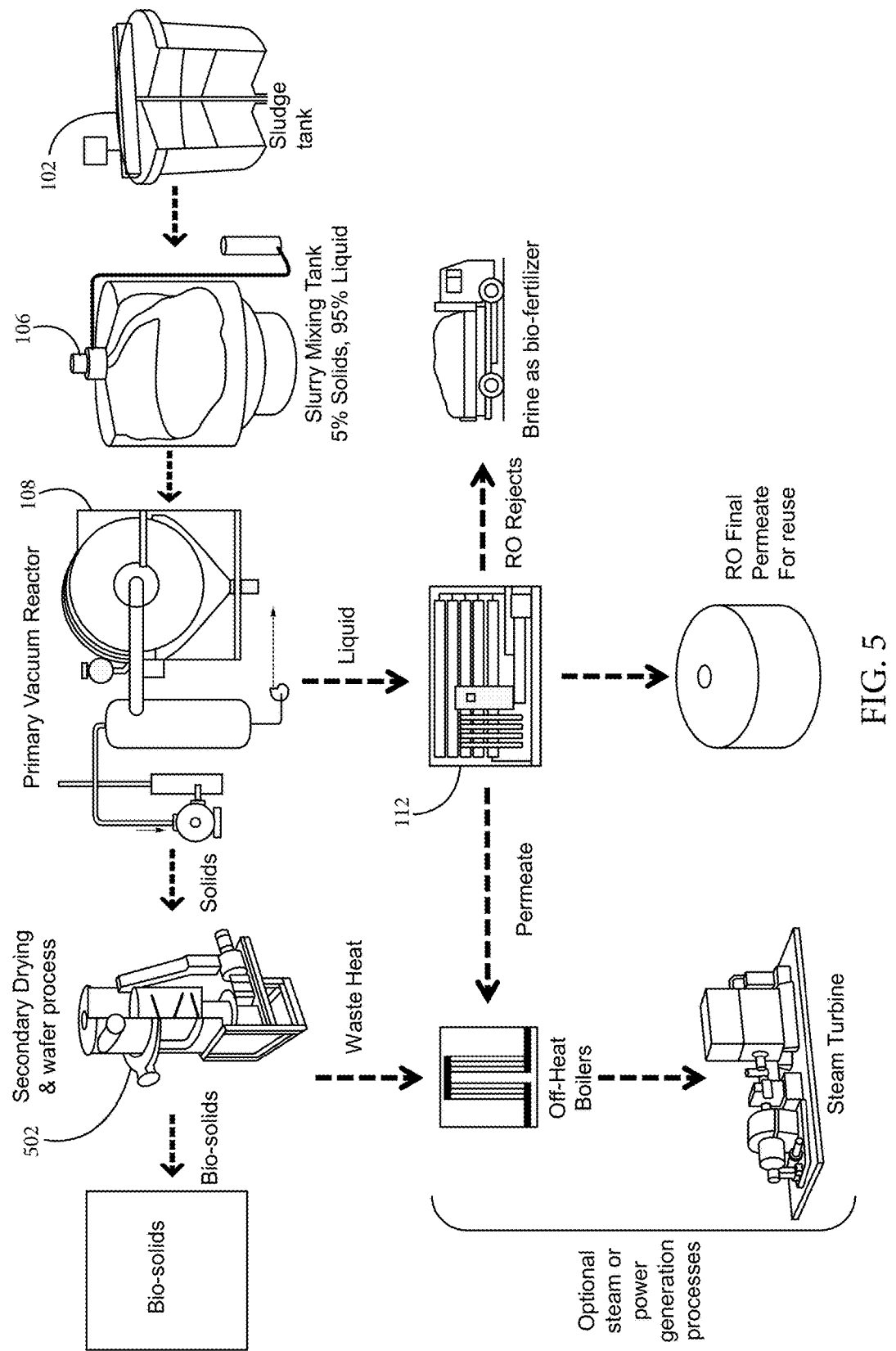
FIG. 5 illustrates an example of the disclosed waste processing system.

FIGS. 1 and 5 illustrate embodiments of the current system and how it uses products from the sludge tank to create more usable end products. In one exemplary embodiment of the method described herein, as illustrated in FIG. 1, the treatment train process starts with waste, which is fed from a source 102 and is 6% solids or less. If the waste is more than 6% solids, it can be diluted using previously processed wastewater. High-pressure injectors, which are built into a pump 104, liquefy the waste as it passes from the source 102, through the pump 104, and into a process tank 106. In the process tank 106, a mixer suspends and mixes the waste into a slurry material. While the slurry is mixed into the process tank 106, pH adjustments can be made. The process tank 106 feeds a rotary vacuum drum filter 108. The drum filter 108 uses a filter aid pre-coat to separate the solids from the liquid.

The filter aid, which can be made of various materials, including diatomaceous earth, Perlite, or in a preferred embodiment, cellulosic material, is pre-coated onto the external surface of the drum. Pre-coating takes place by putting a filter aid slurry in a basin outside of the drum, activating the drum vacuum, and building up a filter aid base on the outside of the drum while the remainder of the filter aid slurry proceeds to the inside of the drum. The drum filter vacuums the pre-coat onto the drum until it reaches the desired filter aid depth. Once this depth is achieved, the drum is ready to receive the slurry material for processing. Typical filter aids, such as diatomaceous earth or Perlite, may be compostable, but are not burnable. This typically renders the post-processing solid material useless for fuel pellets. The use of burnable filter aid, such as cellulosic material, thus provides a significant advantage.

After pre-coating the drum and feeding the waste slurry from the process tank 106, the vacuum force in the drum filter 108 is activated. This force pulls the slurry material onto the surface of the drum, with solid materials captured by the filter aid and separated into a solids tank 110 through the use of an indexing knife, which scrapes off the solid in small increments. The liquid passes through the filter aid and into the interior of the drum. The liquid is then pumped to the process liquid bulk tank 112 for reuse. Any excess liquid overflows the process liquid bulk tank 112 and goes into the value-added fertilizer container 114. The dry solid, filtered with cellulosic material, can be processed further as needed for final use as an energy pellet. The liquid can be converted to a concentrated fertilizer additive or can be run through an additional treatment to be rated as safe, clean, surface water discharge.

With the above process, the moisture content of the initial slurry can be reduced to 20-25%. In one embodiment, some portions of the waste material may be processed twice through the treatment train process shown in FIG. 1 in order to further concentrate the liquid and remove additional water.

In one embodiment, a secondary drying process 502 takes place using natural gas heat in a natural gas oven. This drying process creates steam and a dried cake with a 9-10% moisture level. In another embodiment, the treatment train process can be coupled with infrared or microwaving technology to lower the moisture content even further, potentially to 5%, via exposure to a microwave energy source. This would produce higher-grade energy pellets and could also kill pathogens or microorganisms that may be present in the slurry or post-processing solid or liquid materials.

Alternatively, the treatment train process can be coupled with a high-speed punch press instead of microwaving technology. The press can accept pellet material in sheet form and can punch or hammer the sheet to create puck-shaped pellets out of the accepted material by pressing and heating the remaining moisture out of the material. The product can self-fuse due to the heat and may not break apart or flake.

In one embodiment, the treatment train process can separate the water from the waste onsite at a sewage treatment facility and the clear water can be returned to the sewage treatment facility where it can be used to flush a city's water system.

The treatment train process described herein may be portable or stationary and can process waste from a sewage treatment facility, waste from a Concentrated Animal Feeding Operation (CAFO), vegetable waste, or plant waste onsite where the waste is collected. This portability provides a unique advantage, opening up a range of facilities that normally would not have access to drum filtration and also, in the case of municipal waste, an ability to return post-processing water on-site back to the water plant. This is a significant environmental and process enhancement.

In one embodiment, the post-processed energy pellet may be combined with other biomass to increase the British Thermal Unit (BTU) value. Alternatively, other biomass may be added during the treatment train process to create an energy pellet that has an immediate increased BTU value.

In one embodiment, acid or polymers may be added to the waste in the process tank 106 during a portion or all of the treatment train process. The use of acid or polymers at the beginning of the treatment train process may force metals and corrosives to collect in the liquid portion when the liquid and solid parts are separated in the drum filter 108. If metals and corrosives collect in the liquid portion, the liquid may be manipulated so as to lower the pH and extract the metals. This would leave only leave the water, which, if desired, can be returned to the sewage treatment facility.

The disclosed system reduces land usage and cost, reduces operating costs and retention times, mitigates bad odors, mitigates fluctuating load factors on digesters, results in the recovery of clean water and renewable fuel in the form of bio-sludge pellets, and results in waste heat availability.

I claim:

1. A method of processing waste comprising:
   with a reuse liquid from a process liquid bulk tank, further liquefying a mixture of liquid and solid waste material using high-pressure injectors contained within a pump;
   delivering the further liquefied mixture of liquid and solid waste material into a process tank with the pump:
   mixing the further liquefied mixture of liquid and solid waste material in the process tank to create a slurry material;
   applying a filter aid pre-coat onto an exterior surface of a rotary vacuum drum filter;
   delivering the slurry material into a basin containing the rotary vacuum drum filter;
   operating the rotary vacuum drum filter, including separating the slurry material into solid material and separated liquid, and wherein the solid material is caught in the filter aid pre-coat;
   removing the filter aid pre-coat and solid material from the exterior of the rotary vacuum drum filter by scraping with an indexing knife;
   pumping the separated liquid from the rotary vacuum drum filter to the process liquid bulk tank;
   directing some of the separated liquid in the process liquid bulk tank to the high-pressure injectors contained within the pump as the reuse liquid; and
   directing excess liquid from the process liquid bulk tank to a value-added fertilizer container.

2. The method of claim 1, wherein the filter aid pre-coat is a burnable material.

3. The method of claim 2, wherein the burnable filter aid pre-coat is cellulosic material.

4. The method of claim 1, further comprising the step of removing additional moisture from the solid material by processing the solid material in a secondary drying process that uses natural gas heat.

5. The method of claim 1, further comprising the step of removing additional moisture from the solid material through exposure to a microwave energy source.

6. The method of claim 1, further comprising the step of removing additional moisture from the solid material by processing it through a high-speed punch press.

7. The method of claim 1, wherein the process is repeated to reduce the moisture content further.

8. The method of claim 1, wherein the solid material and filter aid pre-coat are further processed into a pellet form.

9. The method of claim 8, wherein the solid material and filter aid pre-coat of the pellet are a first biomass, and wherein the pellet is combined with a second biomass not included the pellet.

10. The method of claim 1, wherein a biomass added to the waste material.

11. The method of claim 1, wherein applying the filter aid pre-coat onto the exterior surface of a rotary vacuum drum filter comprises:
    putting a filter aid slurry in the basin outside of the rotary vacuum drum filter, activating the vacuum of the rotary vacuum drum filter, and building up a filter aid pre-coat on the outside of the rotary vacuum drum filter while the remainder of the filter aid slurry proceeds to the inside of the rotary vacuum drum filter.

* * * * *